US011075810B2

(12) United States Patent
Jha et al.

(10) Patent No.: US 11,075,810 B2
(45) Date of Patent: Jul. 27, 2021

(54) INFORMATION CENTRIC NETWORK EMERGENCY DATA COLLECTION (71) Applicant: Intel Corporation, Santa Clara, CA (US)

(72) Inventors: Satish Chandra Jha, Hillsboro, OR (US); Rath Vannithamby, Portland, OR (US); S. M. Iftekharul Alam, Hillsboro, OR (US); Yi Zhang, Portland, OR (US); Ned M. Smith, Beaverton, OR (US); Venkatesan Nallampatti Ekambaram, Hillsboro, OR (US); Kathiravetpillai Sivanesan, Portland, OR (US); Kuilin Clark Chen, Hillsboro, OR (US); Srikathyayani Srikanteswara, Portland, OR (US); Zongrui Ding, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/456,864

(22) Filed: Jun. 28, 2019

(65) Prior Publication Data

US 2019/0327148 A1 Oct. 24, 2019

(51) Int. Cl.
*H04L 12/24* (2006.01)
*H04L 29/08* (2006.01)
(Continued)

(52) U.S. Cl.
CPC ...... *H04L 41/0893* (2013.01); *H04L 41/0803* (2013.01); *H04L 43/08* (2013.01);
(Continued)

(58) Field of Classification Search
None
See application file for complete search history.

(56) References Cited

U.S. PATENT DOCUMENTS

2012/0155464 A1* 6/2012 Kim ............... H04L 12/1859
370/390
2014/0269417 A1* 9/2014 Yu ................. H04L 41/0803
370/254
(Continued)

FOREIGN PATENT DOCUMENTS

| CN | 112153606 | 12/2020 |
|----|-----------|---------|
| JE | 102020204476 | 12/2020 |

OTHER PUBLICATIONS

Amadeo, M, "Enhancing Content-Centric Networking for Vehicular Environments", Computer Networks: The International Journal of Computer and Telecommunications Networking, (Nov. 2013), pp. 3222-3234.

(Continued)

*Primary Examiner* — Adnan Baig
(74) *Attorney, Agent, or Firm* — Schwegman Lundberg & Woessner, P.A.

(57) ABSTRACT

Systems and techniques for information centric network (ICN) emergency data collection are described herein. For example, an event coverage area may be measured. An interest packet may be transmitted to map nodes within the coverage area. In an example, the interest packet specifies a group prefix. A group of nodes that respond to the interest packet may be selected as event detecting nodes. Then, an event subscription interest packet may be transmitted to the event-detecting nodes.

24 Claims, 6 Drawing Sheets (51) Int. Cl.
*H04L 12/911* (2013.01)
*H04L 12/26* (2006.01)
(52) U.S. Cl.
CPC ............. *H04L 47/82* (2013.01); *H04L 67/12* (2013.01); *H04L 67/26* (2013.01)

(56) References Cited

U.S. PATENT DOCUMENTS

| | | | |
|---|---|---|---|
| 2015/0029866 A1* | 1/2015 | Liao | H04W 48/14 370/241 |
| 2017/0215123 A1* | 7/2017 | Miranda d'Orey | H04W 40/12 |
| 2018/0176750 A1* | 6/2018 | Xu | H04L 67/12 |
| 2020/0137191 A1* | 4/2020 | Neishaboori | H04W 72/005 |

OTHER PUBLICATIONS

Amadeo, Marica, "Information-centric networking for connected vehicles: a survey and future perspectives", Automotive Networking and Applications IEEE Communications Magazine, (2016), 7 pgs.

* cited by examiner

INFORMATION CENTRIC NETWORK EMERGENCY DATA COLLECTION

TECHNICAL FIELD

Embodiments described herein generally relate to computer networking and more specifically to information centric network (ICN) emergency data collection.

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Vehicular networks may become more prevalent as intelligent vehicles (e.g., autonomous or driver assist systems in vehicles) seek more information about the traveling environment to make better and safer decisions. Infrastructure, such as road side units (RSUs) may also participate in these vehicular networks, providing local information, connections to the cloud, processing or storage assistance for vehicles, etc. Thus, for example, network a node-such as an RSU or other vehicle—may help to collect or store accident and other anomalous situation detail data in RSU's proximity. This data may be used by law enforcement, regulators, government officials, etc. to resolve accident related issues as well as to plan safe driving strategies for the future.

An RSU may be at one-hop or multi-hops in the network from an event (e.g., wreck, accident, obstruction in the road, or other anomalous occurrence) location. An RSU, once notice of the event arrives, may request vehicles in the proximity to send details of the event; these details possibly including information of the event's aftermath (e.g., first responder actions to a car wreck). Other nodes, in response to this request, may respond if they have relevant data. Such an exchange is particularly suited to be transacted via an ICN, where the RSU may request data by content name (e.g., including attributes) rather than having to identify and query nodes that are candidates to respond.

Issues may arise regarding the efficient collection of event details (e.g., images, video, audio, error logs from vehicles, etc.) by an RSU or another node after the event. For example, it may be difficult for the node to ascertain how far (e.g., how many hops) to forward interests, or how to direct interests in the right direction such that they reach candidate nodes without flooding the ICN with interests that will not result in a response. Further, when candidate nodes receive the interest, there may be many with essentially the same information. There may also be a flooding problem from the candidate nodes back to the RSU with essentially redundant responses, although some may be of higher quality than others.

Some techniques to control interest or responsive data packet flooding when data or service is solicited by a node have been developed. For example, responding nodes may run a wait-timer—e.g., a value may be chosen randomly or based on some parameters in a distributed manner—and send it with the response so that other neighbors suppress sending responses after listening to a similar response from another neighbor. Issues remain, however, as these suggestions do not provide an end-to-end ICN mechanism whereby a soliciting node may jointly control and ensure that, for example, highly reliable event detection with high determinism and low overhead. In an example, response flooding control may use an inference engine to select potential producers to achieve high-quality responses and low latency. Efficiency may also be achieved by invoking on-the-fly opportunistic computation by intermediate nodes on responses from various nodes to reduce network traffic. This not only may address flooding issues by aggregation, or response filtering between a consumer and producer node, but may also ensure that the responses that arrive at the consumer are of the highest available quality by eliminating lower quality responses.

For example, a consumer (e.g., soliciting node), such as an RSU, may actively coordinate with neighboring nodes to select a set of event detection nodes and a set of intermediate computation nodes. This may help to ensure a more deterministic event detection and processing data flow to the consumer node. Event Geo-area (e.g., geographic area, location, locality, etc.) and event time producer identification mechanisms may be used to limit interest packet forwarding and data response flooding. Interest packet forwarding to potential producers and data responses to the consumer-including via intermediate nodes—may be efficiently handled by a geographic area-based routing. Here, the routing uses information about the set of pre-selected event detection nodes and intermediate computation nodes.

In an example, an inference engine—e.g., created via a machine learning technique such as an artificial neural network—may be used by potential producers (e.g., nodes in the set of event detection nodes) to avoid redundant data responses and to avoid forwarding any portion of data already forwarded by another neighbor or producer. These examples may be further supplemented with a technique to protect privacy of sensitive data related to the event.

Proactive coordination among nodes participating in event detection and data exchange routing relating to the event detection and subsequent data gathering, enables a soliciting node-such as infrastructure node—to efficiently detect an event, retrieve high-quality data about the event, and secure that information. Additional details and examples are described below.

Figure 1:
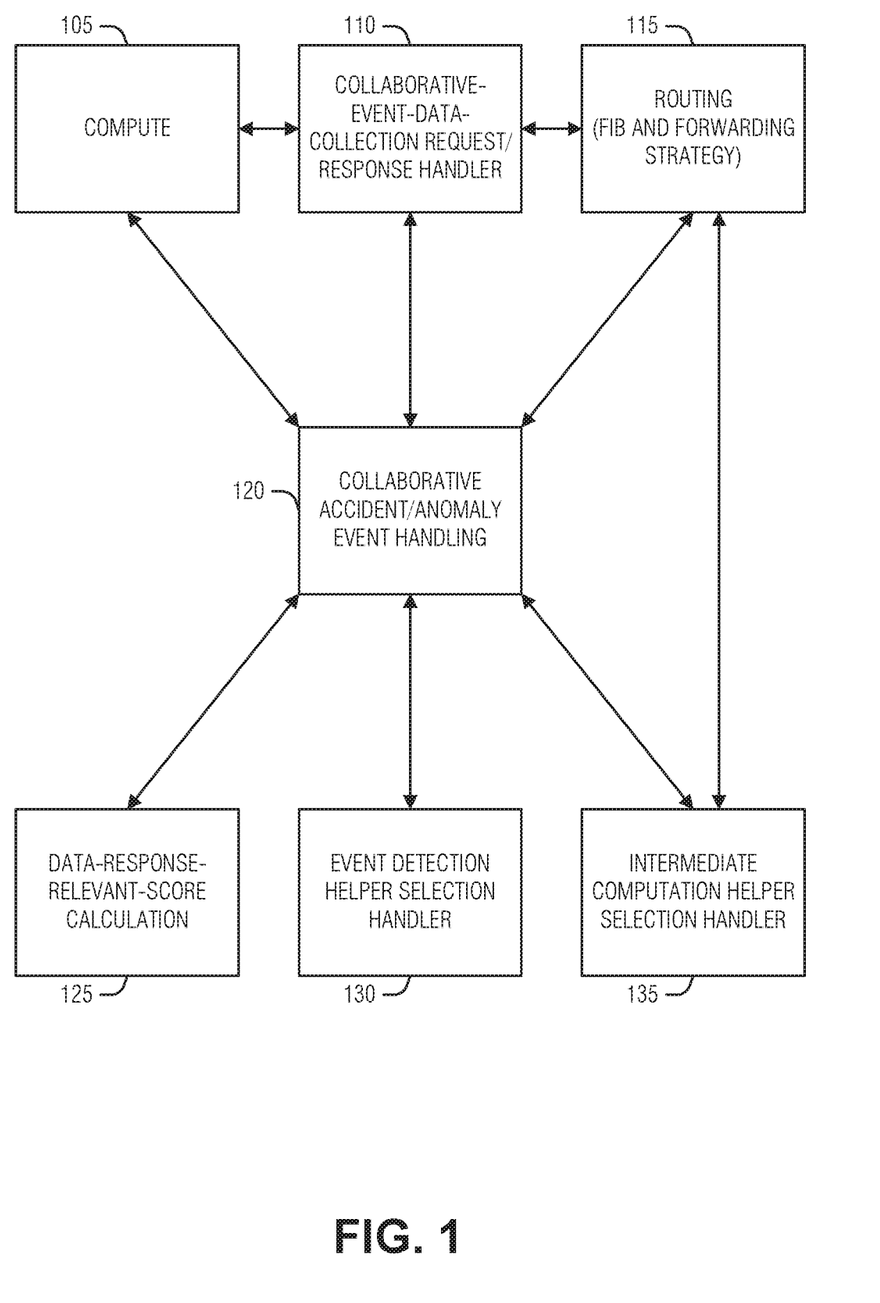
FIG. 1 illustrates an example of ICN component interaction for anomalous event handling, according to an embodiment.

FIG. 1 illustrates an example of ICN component interaction for anomalous event handling, according to an embodiment. Many of the examples described below are in the context of a vehicle network that may include infrastructure elements, such as an RSU. The example events are such things as car crashes, debris on the road, wild fire, chemical spill, or other anomalous happenstances for which data may be collected-such as by vehicle mounted cameras—and used for event mitigation or future mitigation. These examples provide a concrete footing within which to discuss the coordination between nodes, however, the techniques may also be used in a broader context to control data solicitation and flooding suppression wherever it may be found, such as in a security context, crowd control, etc.

Illustrated in FIG. 1 are components of a node participating in event detection coordination. All of the node components described below are implemented by processing circuitry of the node. The illustrated node includes a compute component 105, a request-response component 110, a routing component 115, an event coordinator 120, a data relevance calculator 125, an event detection node selector 130, and an intermediate computation node selector 135. The inclusion of several of these components may be dependent upon the node's role in the event detection and subsequent data solicitation. For example, a vehicle node detecting an event may not include the data relevance calculator 125.

The compute component 105 is configured to provide processing assistance for data aggregation. Thus, for example, if video data from an event may be compressed in transit to a consumer node, the compute component 105 may provide the compression.

The request-response component 110 is configured to identify and address interests or data packet responses for which multi-node collaboration is established. This may be provided by the event coordinator 120, which may maintain a set of name prefixes or tags to identify such messages. The request-response component 110 is configured to interface with the ICN routing component 115 to implement selective forwarding of interests or data packets participating in the coordinated event detection.

The forwarding strategy may include selective forwarding to pre-selected nodes. These nodes may be preselected by the event detection node selector 130 and the intermediate computation node selector 135. These selectors may evaluate several metrics to select nodes that provide adequate coverage of an event, as well as processing data packets in transit to reduce redundant or low-quality results.

Result quality may be ensured via the data relevance calculator 125. The component is configured to evaluate, of data that is passing through the node, whether it has already been sent, or whether it is of a higher quality than that already sent. If it has already been sent or is of a lower quality, the event coordinator 120 may direct the request-response component 110 or the routing component 115 to drop the packet.

Figure 2A:
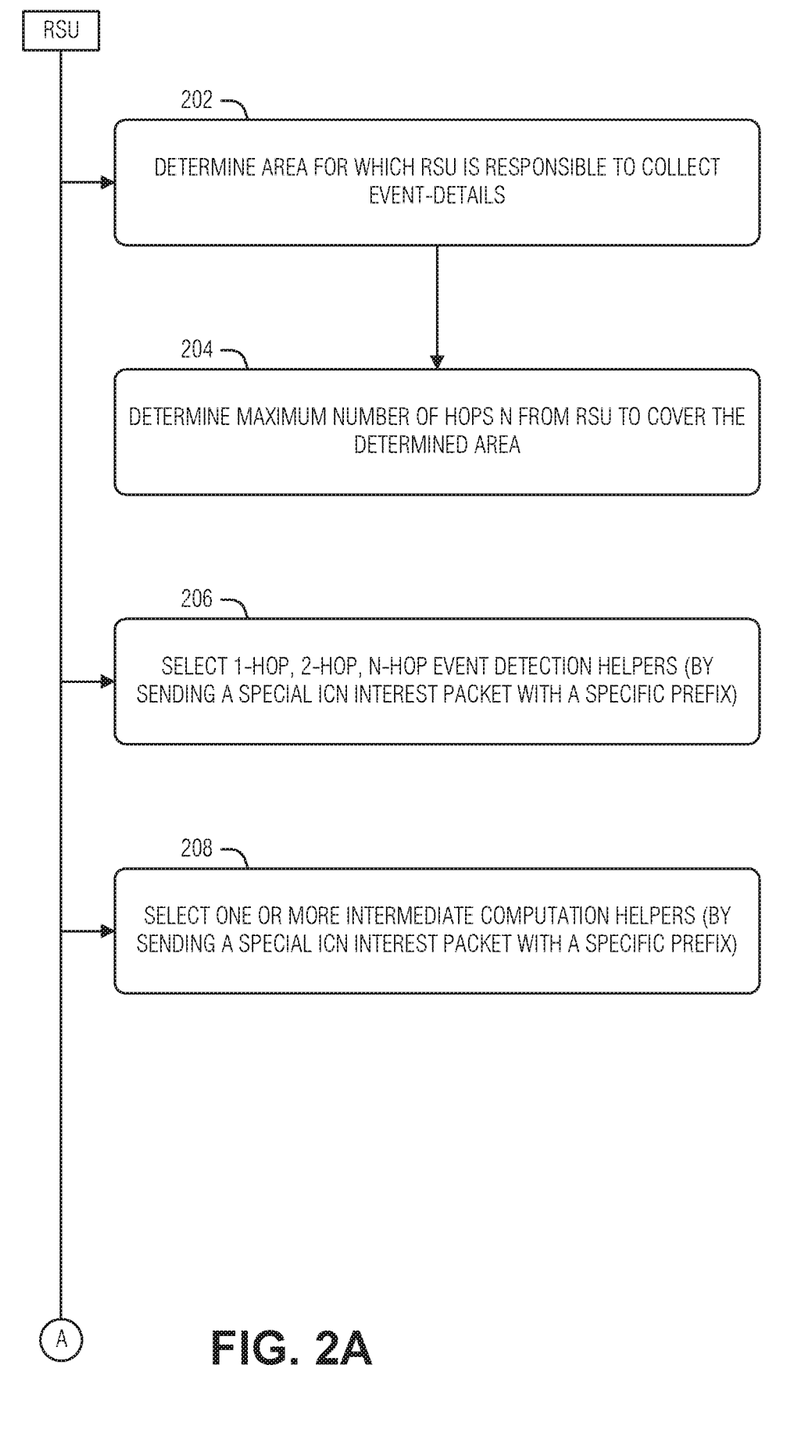
FIGS. 2A-2B is an example of a collaborative event detection, according to an embodiment.
Figure 2B:
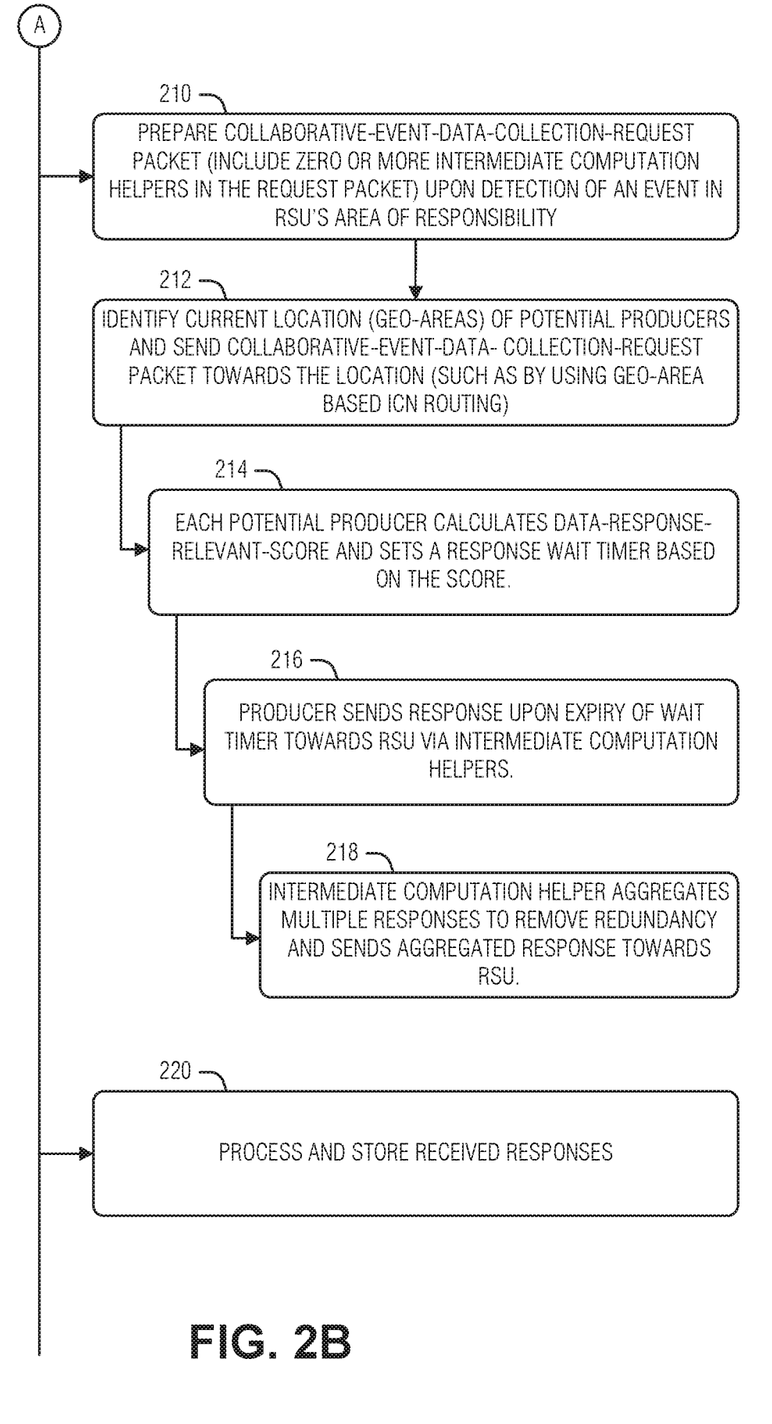

FIGS. 2A-2B is an example of a collaborative event detection, according to an embodiment. Consider an RSU used to exchange vehicle-to-vehicle (V2V) messages among neighboring vehicles (e.g., one or more hops) to detect critical as well as non-critical events, such as safety events, for cooperative safer driving. For example, an RSU detecting a critical event may broadcast a critical event notification immediately. Non-critical event notification may be broadcast less frequently such as via periodic cooperation/awareness/environment-notification messages (e.g., via basic a safety message (BSM), cooperative awareness message (CAM), or decentralized environment notification message (DENM) messages). In most of the cases, event notification described above may be limited to one-hop neighbors. However, pre-selected one or more first-hop neighbors may forward the notification to next-hop neighbors. In an example, a detection node negotiated and selected one or more neighbor nodes, in advance of the event, as forwarder for event-notification.

In an example, the RSU may include IDs of one or more forwarding nodes (e.g., from a neighbor-list) in the event-notification message requesting to forward the notification to a next-hop. If the RSU is within one-hop of event, it may either detect the event by on-board sensors or it may receive the event notification from another node. The mechanism of controlled forwarding of event-notification illustrated in FIG. 2 may be used to facilitate event detection by the RSU.

Based on distance between two consecutive RSUs, an RSU has a defined coverage area for collecting event details (operation 202). After determining the distance between neighbor RSUs, and thus its coverage area, the RSU may estimate a maximum number of hops needed to reach all nodes in the coverage area (operation 204).

The RSU-here named RSU-X—may then select one or more one-hop neighbors (e.g., one in the left direction and one in right direction of road, or more if the RSU is at an intersection) from its neighbor list as Event-Detection-Helper-1st-Hop-RSU-X (operation 206). For example, 1-hop neighbors with good link quality and farther from RSU may be selected. The Event-Detection-Helper-1 st-Hop-RSU-X is configured to forward any event-notification it has received to the RSU-either by broadcast or unicast.

The RSU may inform the Event-Detection-Helper-1st-Hop-RSU-X nodes about the selection and receives confirmation from them (operation 206). In an example, an ICN based handshake message, using a special ICN request and response with a specific prefix, is used to inform these nodes. In an example, nodes in the Event-Detection-Helper-1st-Hop-RSU-X set maintain a non-expiring PIT entry for a prefix-such as "/any-event-notification" to forward any event-notification to the RSU. The following is an example of this PIT entry:

| PIT Example (Event-Detection-Helper-1st-Hop-RSU-X) ||
| --- | --- |
| Prefix | Face(s) |
| /Any-Event-Notification-Prefix | C-V2X-Face-to-RSU |

Similarly, the Event-Detection-Helper-1 st-Hop-RSU-X nodes may add a forward interest base (FIB) entry to forward discovery requests for additional hop (e.g., two, three, etc. hops) Event-Detection-Helpers. In an example, the traditional FIB table with new information, such as geo-location or next hop ID. The following is an example of the modified FIB:

| FIB Example (Event-Detection-Helper-1st-Hop-RSU-X) ||||
| --- | --- | --- | --- |
| Prefix | Face(s) | Next Hop ID | Geo-Area |
| /Event-Detection-Helper-Prefix | C-V2X-Face | 2 | xxxx |

Expansion of the event detection helper nodes to multiple hops may be used to fully cover the coverage area for the RSU. Thus, in an example, the RSU sends an ICN Interest packet with a specific second-hop prefix, such as "/discover-Event-Detection-Helper-2nd-Hop-RSU-X". Only Event-Detection-Helper-1st-Hop-RSU-X nodes take action when receiving an interest with this prefix. An Event-Detection-Helper-1st-Hop-RSU-X node selects one or more neighbors—e.g., with good link quality and farther from it than the RSU within the coverage area—from its neighbor-list as an Event-Detection-Helper-2nd-Hop-RSU-X node. The Event-Detection-Helper-1 st-Hop-RSU-X node then informs and receives confirmation from these nodes as Event-Detection-Helper-2nd-Hop-RSU-X. The Event-Detection-Helper-1st-Hop-RSU-X node then informs the RSU about the selection of Event-Detection-Helper-2nd-Hop-RSU-X node. Event-Detection-Helper-2nd-Hop-RSU-X nodes are configured to forward any event-notification receives to the RSU via an Event-Detection-Helper-1st-Hop-RSU-X node. This expansion may be continued (e.g., third hop nodes, fourth hop nodes, etc.) until the RSU has a pre-selected network of helper nodes to cover the coverage area. In an example, helper selection is periodically updated to address the dynamic environment of vehicular network.

As with the helper nodes, the RSU may select nodes as intermediate computation nodes (operation 208). That is, the RSU may specify one or more Intermediate-Computation-Helper-RSU-X nodes located in one or more Geo-areas on route as candidates to aggregate multiple responses in a reverse path and remove redundancy before forwarding in order to reduce network traffic in a reverse path. A potential list of Intermediate-Computation-Helper-RSU-X nodes may be selected periodically in advance in a similar way as described for Event-Detection-Helper nodes selection. For example, a special interest packet with a specific prefix, such as "/discover-Intermediate-Computation-Helper," may be periodically broadcast. In an example, this interest packet is scoped to the coverage area for the RSU. Interested nodes may respond. From these responding nodes, the RSU may select a potential list of Intermediate-Computation-Helper-RSU-X nodes and inform them of the selection. In an example, Event-Detection-Helper nodes that have sufficient computational capabilities may be selected as Intermediate-Computation-Helper nodes. In an example, one or more nodes from the Intermediate-Computation-Helper-RSU-X nodes list may be indicated in Collaborative-Event-Data-Collection-Requests.

The operations above illustrate the ways in which the collaborative event detection and response processing network may be formed. After formation, the following may be used to request event details. For example, once an event-notification-which may carry event-location, event-time, type of events, and so on—is received by the RSU, the RSU prepares a Collaborative-Event-Data-Collection-Request interest packet (operation 210). Attributes included in this interest may be based on the event-notification attributes (such as type of event, safety critical or non-critical, etc.). For example, if there is an accident with people injured, faster response and higher quality image or video data may be needed to help first responders determine which emergency services to send. On the other hand, if the accident is minor (e.g., minor damage to vehicles) the low-latency requirement may be relaxed as well and the data quality threshold may be lowered (e.g., accepting lower quality of image or video data). The RSU may give a range of options (e.g., with minimum acceptance thresholds) regarding image quality or other data. In an example, the RSU includes attributes or requirements for Collaborative-Event-Data-Collection in the Collaborative-Event-Data-Collection-Request interest packet.

Because the Collaborative-Event-Data-Collection-Request is usually sent shortly after the event, the content producers (e.g., vehicles) may not have moved very far from the event-location. If the potential producers—e.g., vehicles present in proximity to the event at the time of event—have not moved that far, may use the path followed by Event-Detection-Helper nodes. The last hop node (Event-Detection-Helper node closest to the event location) may broadcast Collaborative-Event-Data-Collection-Request packet to reach the producers (operation 212).

In an example, the RSU may use Geo-Area based routing towards a current location of potential producers. In an example, the RSU determines potential Geo-areas to route the Collaborative-Event-Data-Collection-Request based on a variety of information, such as event-location, event-time, current-time, expected speed, direction, or trajectories of potential producers. For example, if an event happens at intersection, a potential producer may be in multiple Geo-Areas (e.g., roads).

In an example, the RSU may scope the validity of Collaborative-Event-Data-Collection-Request in several ways. For example, the RSU may include Geo-Areas in the Collaborative-Event-Data-Collection-Request so that only vehicles in these specified Geo-Areas respond (e.g., when they receive the interest). In an example, the RSU may include Geo-Areas and Event-Time in the Collaborative-Event-Data-Collection-Request so that only vehicles in these Geo-Areas at the specified Event-Time may respond.

In Geo-Area based routing, a node knowing its Geo-area may determine a next Geo-Area towards a given Geo-area of the data. Geo grid map systems, such as Military Grid Reference System MGRS, or Geo-Hash, may be used to divide the world into approximately rectangular Geo-areas of various granularities (such as 1 km by 1 km, 100 m by 100 m, 10 m by 10 m and so on). The geo-areas may be represented by a string of digits and letters. A vehicle equipped with GPS sensors may determine its location and calculate its Geo-Area from this information.

In an example, the Collaborative-Event-Data-Collection-Request is forwarded geo-area to geo-area. To control Collaborative-Event-Data-Collection-Request flooding only one or two nodes in a Geo-Area may forward the Collaborative-Event-Data-Collection-Request to a next Geo-Area. To control this forwarding mechanism with minimal overhead, a Request-Forward-Wait-Timer, managed in a distributed fashion, may be used at each node. For example, each node selects a value for the Request-Forward-Wait-Timer based on reachability-to-Next-hop-Geo-Area parameters. For example, a smaller timer value may be selected for a node closer to a next-hop geo-area with higher neighbor count from the next-hop Geo area in its neighbor-list, for better link quality with an Intermediate-Computation-Helper-RSU-X node if the Intermediate-Computation-Helper-RSU-X is in next-hop Geo-Area and so on. If Intermediate-Computation-Helper-RSU-X nodes are present in a geo-area, these nodes may get higher priority (e.g., shorter Request-Forward-Wait-Timer value) to forward the Collaborative-Event-Data-Collection-Request.

Potential producers determine Data-Response-Relevant-Scores in a distributed manner based on several factors (operation 214). These factors may include attributes or requirements specified in the Collaborative-Event-Data-Collection-Request. Other factors may include distance of the producer from the event at the time of the event, quality of stored data, best view of the event scenario at event-time, critical component or object (e.g., an injured person identification) captured, and so on.

In an example, a Data-Response-Relevant-Score may be used to determine how much information the data present at the vehicle (e.g., potential producer) has with regard to the event of interest. For example, if the exact location of the event is identified, then, based on the camera parameters, the vehicle may identify whether the camera feed has sufficient coverage of the event and base the Data-Response-Relevant-Score on this. In an example, an inference engine (e.g., a deep neural net) may be trained to accept a raw camera feed as input and output a score that determine how relevant the video feed is to the event of interest. In an example, the inference engine may be trained using offline camera or video data that contains varied viewpoints of different event scenarios labeled with different scores. In an example, the training data may be synthetic data generated using simulators such as CARLA.

Once obtained, the Data-Response-Relevant-Score then may be mapped to a Response-Forward-Wait-Timer value. The higher the Data-Response-Relevant-Score, the smaller the Response-Forward-Wait-Timer. The producer whose Response-Forward-Wait-Timer expires first forwards the Event-Related data to the next-hop Geo-Area towards the requesting RSU (operation 216). If Intermediate-Computation-Helper-RSU-X node is specified in Collaborative-Event-Data-Collection-Request, the producer may forward the response towards geo-area of Intermediate-Computation-Helper-RSU-X. In an example, neighboring producers may reset running Response-Forward-Wait-Timers after receiving a response from other producers.

In an example, the response from the producer includes an event-related data part and an additional part that specifies data attributes to enable a next potential producer to remove redundancy in the subsequent response from the next potential producer. Examples of such data attributes include camera position and orientation, focal length, intrinsic and extrinsic parameters of the cameras, camera resolution and the Data-Response-Relevant-Score as determined above. The data in the additional part may be used by a node to determine which part of its data is relevant and transmit only that relevant data. This additional data may also be used by intermediate nodes to compress or aggregate (e.g., stitch) the received data from multiple nodes.

The next Producer, for which Response-Forward-Wait-Timer expires next, forwards data with an additional field adding attributes to the data to a next-hop geo-area in the direction of the RSU or an Intermediate-Computation-Helper-RSU-X node. If the producer has computational capability, it may process its data before forwarding in order to remove portions that overlapped with the data already forwarded by earlier producers. In an example, whenever feasible, the producer may combine its data with the data already forwarded by earlier producers.

In an example, in an intermediate geo-area-such as a geo-area without producers in route to the RSU—each node calculates a value for Response-Forward-Wait-Timer based on reachability-to-Next-hop-Geo-Area parameters. In an example, a smaller timer value may be selected for a node closer to the next-hop geo-area, with higher neighbor count from the next-hop geo-area in its neighbor-list, better Link quality with Intermediate-Computation-Helper-RSU-X nodes, Intermediate-Computation-Helper-RSU-X in next-hop Geo-Area and so on. Thus, in an example, if Intermediate-Computation-Helper-RSU-X nodes are present in a geo-area, these nodes get higher priority (e.g., shorter Request-Forward-Wait-Timer value) to forward a response.

In an example, only Intermediate-Computation-Helper-RSU-X nodes in a geo-area forward responses. This enables these Intermediate-Computation-Helper-RSU-X nodes to collect multiple responses from different producers. In an example, the Intermediate-Computation-Helper-RSU-X node processes all responses to aggregate them (operation 218). This may reduce redundancy in the responses before forwarding to towards the RSU. In an example, the Intermediate-Computation-Helper-RSU-X node may leave some level of redundancy in the responses. This redundancy may be helpful to improve the quality or reliability of the data. In an example, the RSU may specify a flag to specify the acceptable level of redundancy. Once received back at the RSU, the RSU then process and stored the received responses (operation 220).

Accident event-notification may carry event-location, event-time, type of events, and other sensitive information. Often accidents involve legal proceedings involving insurance companies and affected parties and their legal representatives. This is sensitive information that may affect outcomes of legal proceedings as well as may cause unnecessary pain and suffering to affected parties if the information is abused. In an example, event information may be protected using encryption and controlled disclosure of bulk encryption keys. For example, camera or other vehicle data—e.g., captured by on-board sensors and stored by on-board or infrastructure provided "black box"—may be encrypted with a bulk encryption key (BEK) at time of collection. The BEK may be wrapped using one or more public wrapping keys (e.g., a BEK Wrapping Key (BWK)). In an example, the BWK may be an RSA asymmetric key or a post-quantum safe asymmetric key. The public key may be issued by any number of trusted entities, such as a government, traffic management service, DMV, insurance company, police, lawyer, etc.

Encrypted data and wrapped BEK blocks (WBB) may be archived securely in any available content store. When a trusted entity attempts to retrieve (e.g., read) the data, the entity obtains the WBB corresponding to their BWK, unwraps the BEK then decrypts the contents. An ICN may be used to store and propagate WBB blocks. Because multiple copies of the WBB may exist in an ICN, an ICN implementation may improve performance, redundancy, resiliency and availability of the WBB.

In an example, WBB holders may authenticate a requestor before delivering the WBB. Such authentication may be accomplished via an authentication credential (e.g. certificate, OAuth token, password, etc.) to establish that the BWK holder is authorized to receive the BEK and cleartext content. For example, release of accident information may be contingent on a legal request to disclose evidence. In an example, content metadata may be exposed outside of the encrypted content for use by the ICN to allow interest packet responses. Content may be packaged in a manifest-such as IETF RFC 8152—that enables both encrypted and signed-cleartext contents. For example, the accident instance name may be part of the integrity protected clear-text section of the manifest while the details of the accident would be part of the encrypted section of the manifest.

Figure 3:
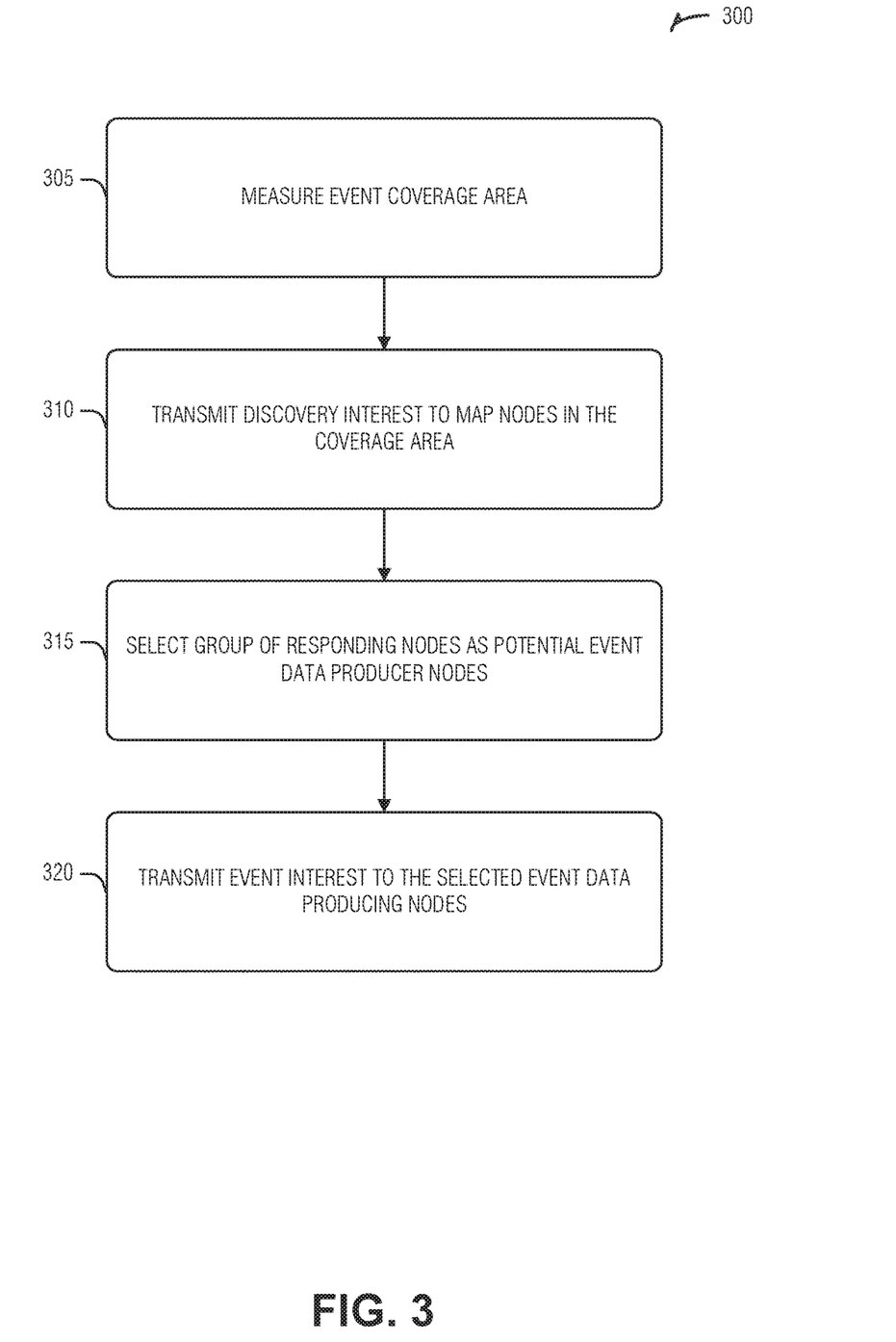
FIG. 3 is an example of a method for ICN approximate calculation caching, according to an embodiment.

FIG. 3 is an example of a method for ICN approximate calculation caching, according to an embodiment. The operations of the method 300 are implemented in computing hardware, such as that described in FIG. 4 or 5 (e.g., processing circuitry).

At operation 305, an event coverage area is measured. This may be accomplished in a number of ways. For example, an RSU may contact other RSUs, comparing the geographic locations among them, and dividing an area based on their respective locations.

At operation 310, an interest packet is sent to map nodes within the coverage area, the interest packet specifying a group prefix. The group prefix is an ICN name prefix that is used to identify the coordinating group of nodes with respect to event detection in the coverage area.

At operation 315, a group of nodes that respond to the interest packet are selected as event detecting nodes. This selection is based on metrics such as dispersal in the coverage area, connectivity, and sensor capability. The selection operates to reduce the number of participating nodes without sacrificing data gathering capabilities with respect to a potential event.

In an example, selecting the group of nodes as the event detecting nodes includes notifying selected nodes. In an example, notification to a node in the event detecting nodes includes identification of an intermediate computation node. Here, the node provides a response to an event subscription interest packet via the intermediate computation node. In an example, the intermediate computation node is the only node permitted to transmit responses to the event subscription interest packet that traverse a geographic sub-part of the coverage area. Thus, the coverage area may be sub-divided and no node other than the intermediate computation node may provide a response to an inquiry about the event from an RSU. In an example, the intermediate computation node at least one aggregates responses or compresses responses it receives from other nodes.

At operation 320, an event subscription interest packet is transmitted to the event-detecting nodes. This interest is directed to nodes selected as part of the event detection coordination. Thus, the interest may include a name prefix or tag such that it is ignored by unselected nodes. In an example, includes an indication of a level of acceptable redundancy in response data. In an example, the subscription interest packet includes a minimum threshold for an attribute of response data. These elements may combine to ensure that the data received in response to the interest meets quality standards for the event in question. As mentioned above, however, these standards may be event dependent, requiring greater detail and redundancy for serious events and less of each for less serious events.

In an example, the method 300 may be extended to include transmitting a relay interest packet to identify relay nodes, and selecting a group of relay nodes from responses. These relay nodes provide connectivity to event detection nodes that beyond a single hop from the coordination node (e.g., the RSU). In an example, nodes in the group of relay nodes themselves perform a relay node selection until the event detecting nodes cover the coverage area and are within one hop to a relay node. This ever-expanding ring of relays efficiently produces a network within a network to address coordinated routing within the event detection framework. In an example, the relay nodes filter responses to the event subscription interest packet to remove redundancy. In an example, an inference engine is used to remove redundancy from responses.

Figure 4:
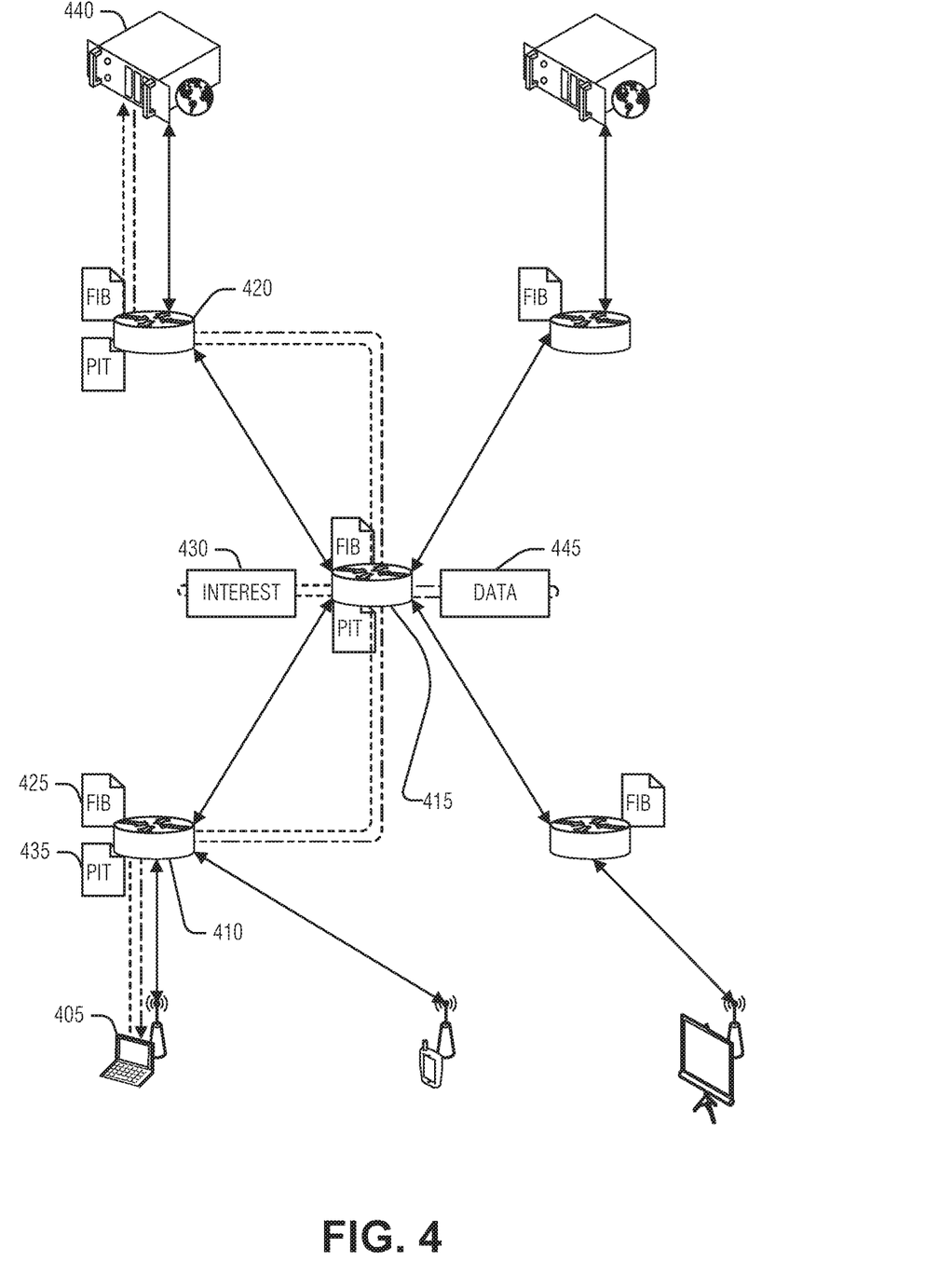
FIG. 4 illustrates an example ICN, according to an embodiment.
Figure 5:
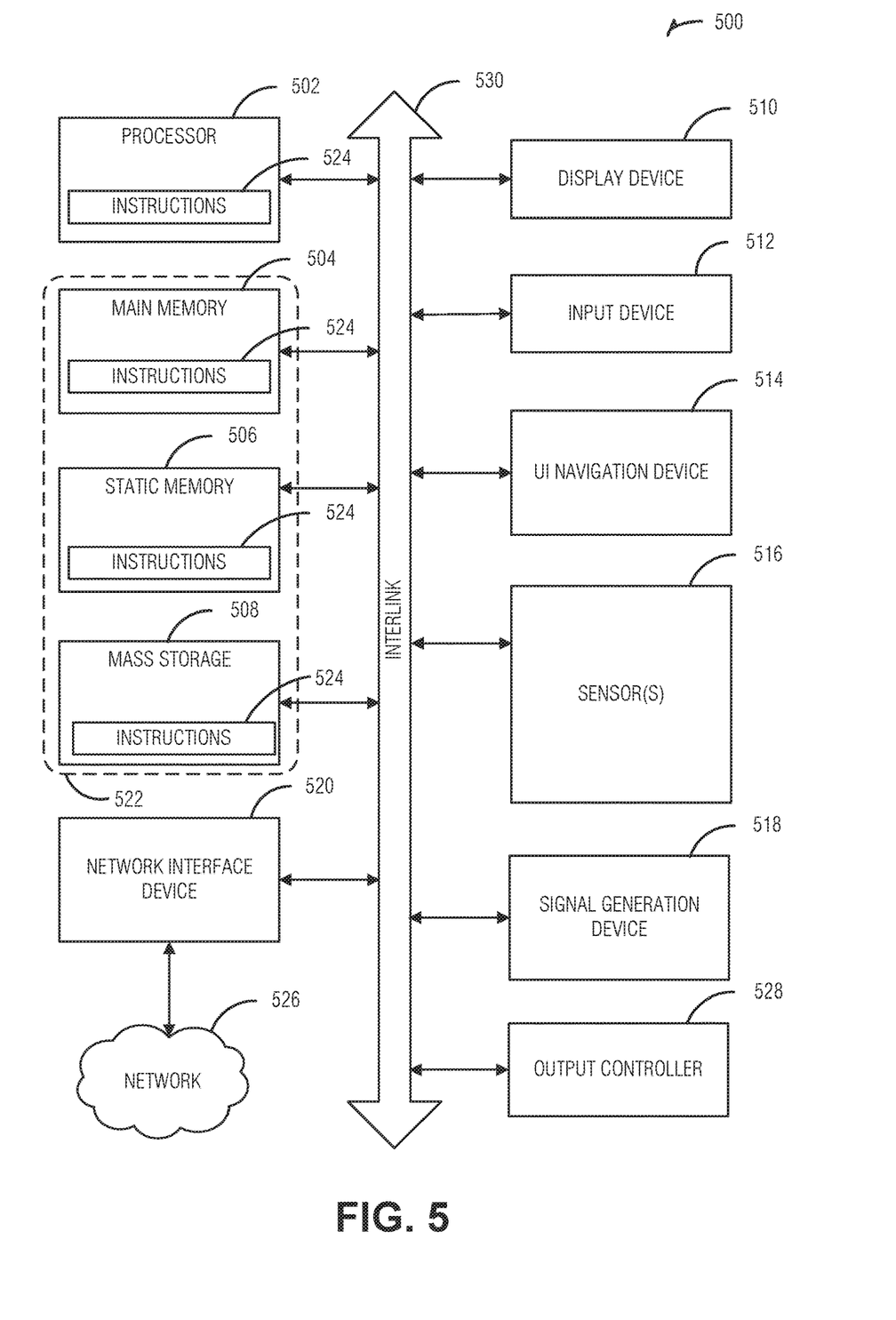
FIG. 5 is a block diagram illustrating an example of a machine upon which one or more embodiments may be implemented.

FIGS. 4 and 5 below provide additional details of the components in FIG. 1. For example, FIG. 4 illustrates several details and variations in ICNs. FIG. 5 illustrates several examples of computer hardware that may be used to implement any of the components illustrated in FIG. 1.

FIG. 4 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 405 (e.g., subscriber) requests named content from the network itself. The content request may be called an interest and transmitted via an interest packet 430. As the interest packet traverses network devices (e.g., network elements, routers, switches, hubs, etc.)—such as network elements 410, 415, and 420-a record of the interest is kept, for example, in a pending interest table (PIT) at each network element. Thus, network element 410 maintains an entry in its PIT 435 for the interest packet 430, network element 415 maintains the entry in its PIT, and network element 420 maintains the entry in its PIT.

When a device, such as publisher 440, that has content matching the name in the interest packet 430 is encountered, that device 440 may send a data packet 445 in response to the interest packet 430. Typically, the data packet 445 is tracked back through the network to the source (e.g., device 405) by following the traces of the interest packet 430 left in the network element PITs. Thus, the PIT 435 at each network element establishes a trail back to the subscriber 405 for the data packet 445 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 430 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 430 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 430 to data cached in the ICN element. Thus, for example, if the data 445 named in the interest 430 is cached in network element 415, then the network element 415 will return the data 445 to the subscriber 405 via the network element 410. However, if the data 445 is not cached at network element 415, the network element 415 routes the interest 430 on (e.g., to network element 420). To facilitate routing, the network elements may use a forwarding information base 425 (FIB) to match named data to an interface (e.g., physical port) for the route. Thus, the FIB 425 operates much like a routing table on a traditional network device.

In an example, additional meta-data may be attached to the interest packet 430, the cached data, or the route (e.g., in the FIB 425), to provide an additional level of matching. For example, the data name may be specified as "www.some-domain.com or videos or v8675309," but also include a version number—or timestamp, time range, endorsement, etc. In this example, the interest packet 430 may specify the desired name, the version number, or the version range. The matching may then locate routes or cached data matching the name and perform the additional comparison of meta-data or the like to arrive at an ultimate decision as to whether data or a route matches the interest packet 430 for respectively responding to the interest packet 430 with the data packet 445 or forwarding the interest packet 430.

ICN has advantages over host-based networking because the data segments are individually named. This enables aggressive caching throughout the network as a network element may provide a data packet 430 in response to an interest 430 as easily as an original author 440. Accordingly, it is less likely that the same segment of the network will transmit duplicates of the same data requested by different devices.

Fine grained encryption is another feature of many ICN networks. A typical data packet 445 includes a name for the data that matches the name in the interest packet 430. Further, the data packet 445 includes the requested data and may include additional information to filter similarly named data (e.g., by creation time, expiration time, version, etc.). To address malicious entities providing false information under the same name, the data packet 445 may also encrypt its contents with a publisher key or provide a cryptographic hash of the data and the name. Thus, knowing the key (e.g., from a certificate of an expected publisher 440) enables the recipient to ascertain whether the data is from that publisher 440. This technique also facilitates the aggressive caching of the data packets 445 throughout the network because each data packet 445 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI)

navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a device for information centric network (ICN) emergency data collection, the device comprising: processing circuitry; and a memory including instructions that, when executed by the processing circuitry, configure the processing circuitry to: measure an event coverage area; transmit an interest packet to map nodes within the coverage area, the interest packet specifying a group prefix; select a group of nodes that respond to the interest packet as event detecting nodes; and transmit an event subscription interest packet to the event-detecting nodes.

In Example 2, the subject matter of Example 1, wherein the subscription interest packet includes an indication of a level of acceptable redundancy in response data.

In Example 3, the subject matter of Example 2, wherein the subscription interest packet includes a minimum threshold for an attribute of response data.

In Example 4, the subject matter of any of Examples 1-3, wherein the instructions configure the processing circuitry to: transmit a relay interest packet to identify relay nodes; and select a group of relay nodes from responses.

In Example 5, the subject matter of Example 4, wherein nodes in the group of relay nodes themselves perform a relay node selection until the event detecting nodes cover the coverage area and are within one hop to a relay node.

In Example 6, the subject matter of any of Examples 4-5, wherein relay nodes filter responses to the event subscription interest packet to remove redundancy.

In Example 7, the subject matter of Example 6, wherein an inference engine is used to remove redundancy from responses.

In Example 8, the subject matter of any of Examples 1-7, wherein, to select the group of nodes as the event detecting nodes, the instructions configure the processing circuitry to notify selected nodes.

In Example 9, the subject matter of Example 8, wherein notification to a node in the event detecting nodes includes identification of an intermediate computation node, wherein the node provides a response to the event subscription interest packet via the intermediate computation node.

In Example 10, the subject matter of Example 9, wherein the intermediate computation node only transmits responses to the event subscription interest packet that traverse a geographic sub-part of the coverage area.

In Example 11, the subject matter of any of Examples 9-10, wherein the intermediate computation node at least one aggregates responses or compresses responses it receives from other nodes.

Example 12 is a method for information centric network (ICN) emergency data collection, the method comprising: measuring an event coverage area; transmitting an interest packet to map nodes within the coverage area, the interest packet specifying a group prefix; selecting a group of nodes that respond to the interest packet as event detecting nodes; and transmitting an event subscription interest packet to the event-detecting nodes.

In Example 13, the subject matter of Example 12, wherein the subscription interest packet includes an indication of a level of acceptable redundancy in response data.

In Example 14, the subject matter of Example 13, wherein the subscription interest packet includes a minimum threshold for an attribute of response data.

In Example 15, the subject matter of any of Examples 12-14, comprising: transmitting a relay interest packet to identify relay nodes; and selecting a group of relay nodes from responses.

In Example 16, the subject matter of Example 15, wherein nodes in the group of relay nodes themselves perform a relay node selection until the event detecting nodes cover the coverage area and are within one hop to a relay node.

In Example 17, the subject matter of any of Examples 15-16, wherein relay nodes filter responses to the event subscription interest packet to remove redundancy.

In Example 18, the subject matter of Example 17, wherein an inference engine is used to remove redundancy from responses.

In Example 19, the subject matter of any of Examples 12-18, wherein selecting the group of nodes as the event detecting nodes includes notifying selected nodes.

In Example 20, the subject matter of Example 19, wherein notification to a node in the event detecting nodes includes identification of an intermediate computation node, wherein the node provides a response to the event subscription interest packet via the intermediate computation node.

In Example 21, the subject matter of Example 20, wherein the intermediate computation node only transmits responses to the event subscription interest packet that traverse a geographic sub-part of the coverage area.

In Example 22, the subject matter of any of Examples 20-21, wherein the intermediate computation node at least one aggregates responses or compresses responses it receives from other nodes.

Example 23 is at least one machine-readable medium including instructions for information centric network (ICN) emergency data collection, the instructions, when executed by processing circuitry, cause the processing circuitry to perform operations comprising: measuring an event coverage area; transmitting an interest packet to map nodes within the coverage area, the interest packet specifying a group prefix; selecting a group of nodes that respond to the interest packet as event detecting nodes; and transmitting an event subscription interest packet to the event-detecting nodes.

In Example 24, the subject matter of Example 23, wherein the subscription interest packet includes an indication of a level of acceptable redundancy in response data.

In Example 25, the subject matter of Example 24, wherein the subscription interest packet includes a minimum threshold for an attribute of response data.

In Example 26, the subject matter of any of Examples 23-25, wherein the operations comprise: transmitting a relay interest packet to identify relay nodes; and selecting a group of relay nodes from responses.

In Example 27, the subject matter of Example 26, wherein nodes in the group of relay nodes themselves perform a relay node selection until the event detecting nodes cover the coverage area and are within one hop to a relay node.

In Example 28, the subject matter of any of Examples 26-27, wherein relay nodes filter responses to the event subscription interest packet to remove redundancy.

In Example 29, the subject matter of Example 28, wherein an inference engine is used to remove redundancy from responses.

In Example 30, the subject matter of any of Examples 23-29, wherein selecting the group of nodes as the event detecting nodes includes notifying selected nodes.

In Example 31, the subject matter of Example 30, wherein notification to a node in the event detecting nodes includes identification of an intermediate computation node, wherein the node provides a response to the event subscription interest packet via the intermediate computation node.

In Example 32, the subject matter of Example 31, wherein the intermediate computation node only transmits responses to the event subscription interest packet that traverse a geographic sub-part of the coverage area.

In Example 33, the subject matter of any of Examples 31-32, wherein the intermediate computation node at least one aggregates responses or compresses responses it receives from other nodes.

Example 34 is a system for information centric network (ICN) emergency data collection, the system comprising: means for measuring an event coverage area; means for transmitting an interest packet to map nodes within the coverage area, the interest packet specifying a group prefix; means for selecting a group of nodes that respond to the interest packet as event detecting nodes; and means for transmitting an event subscription interest packet to the event-detecting nodes.

In Example 35, the subject matter of Example 34, wherein the subscription interest packet includes an indication of a level of acceptable redundancy in response data.

In Example 36, the subject matter of Example 35, wherein the subscription interest packet includes a minimum threshold for an attribute of response data.

In Example 37, the subject matter of any of Examples 34-36, comprising: means for transmitting a relay interest packet to identify relay nodes; and means for selecting a group of relay nodes from responses.

In Example 38, the subject matter of Example 37, wherein nodes in the group of relay nodes themselves perform a relay node selection until the event detecting nodes cover the coverage area and are within one hop to a relay node.

In Example 39, the subject matter of any of Examples 37-38, wherein relay nodes filter responses to the event subscription interest packet to remove redundancy.

In Example 40, the subject matter of Example 39, wherein an inference engine is used to remove redundancy from responses.

In Example 41, the subject matter of any of Examples 34-40, wherein the means for selecting the group of nodes as the event detecting nodes include means for notifying selected nodes.

In Example 42, the subject matter of Example 41, wherein notification to a node in the event detecting nodes includes identification of an intermediate computation node, wherein the node provides a response to the event subscription interest packet via the intermediate computation node.

In Example 43, the subject matter of Example 42, wherein the intermediate computation node only transmits responses to the event subscription interest packet that traverse a geographic sub-part of the coverage area.

In Example 44, the subject matter of any of Examples 42-43, wherein the intermediate computation node at least one aggregates responses or compresses responses it receives from other nodes.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for information centric network (ICN) emergency data collection, the device comprising: processing circuitry; and a memory including instructions that, when executed by the processing circuitry, configure the processing circuitry to: measure an event coverage area; transmit an interest packet specifying a group prefix for the coverage area to identify nodes within the coverage area; select a group of nodes that respond to the interest packet specifying the group prefix as event detecting nodes, the event detecting nodes selected from responding nodes based on metrics of the responding nodes, the responding nodes including all nodes that sent data packets in response to the interest packet specifying the group prefix, the metrics including dispersal in the coverage area, connectivity, or sensor capability, the group of nodes selected from all nodes that respond based on the metrics; and transmit an event subscription interest packet to the event detecting nodes, the event subscription interest packet including a prefix or tag causing the event subscription interest packet to be ignored by responding nodes that are not event detecting nodes.

2. The device of claim 1, wherein the subscription interest packet includes an indication of a level of acceptable redundancy in response data.

3. The device of claim 1, wherein the instructions configure the processing circuitry to:
   transmit a relay interest packet to identify relay nodes; and
   select a group of relay nodes from responses.

4. The device of claim 3, wherein nodes in the group of relay nodes themselves perform a relay node selection until the event detecting nodes cover the coverage area and are within one hop to a relay node.

5. The device of claim 1, wherein, to select the group of nodes as the event detecting nodes, the instructions configure the processing circuitry to notify selected nodes.

6. The device of claim 5, wherein notification to a node in the event detecting nodes includes identification of an intermediate computation node, wherein the node provides a response to the event subscription interest packet via the intermediate computation node.

7. The device of claim 6, wherein the intermediate computation node only transmits responses to the event, subscription interest packet that traverse a geographic sub-part of the coverage area.

8. The device of claim 6, wherein the intermediate computation node east one aggregates responses or compresses responses it receives from other nodes.

9. A method for information centric network (ICN) emergency data collection, the method comprising: measuring an event coverage area; transmitting an interest packet specifying a group prefix for the coverage area to identify nodes within the coverage area; selecting a group of nodes that respond to the interest packet specifying the group prefix as event detecting nodes, the event detecting nodes selected from responding nodes based on metrics of the responding nodes, the responding nodes including all nodes that sent data packets in response to the interest packet specifying the group prefix, the metrics including dispersal in the coverage area, connectivity, or sensor capability, the group of nodes selected from all nodes that respond based on the metrics; and transmitting an event subscription interest packet to the event detecting nodes, the event subscription interest packet including a prefix or tag causing the event subscription interest packet to be ignored by responding nodes that are not event detecting nodes.

10. The method of claim 9, wherein the subscription interest packet includes an indication of a level of acceptable redundancy in response data.

11. The method of claim 9, comprising:
transmitting a relay interest packet to identify relay nodes; and
selecting a group of relay nodes from responses.

12. The method of claim 11, wherein nodes in the group of relay nodes themselves perform a relay node selection until the event detecting nodes cover the coverage area and are within one hop to a relay node.

13. The method of claim 9, wherein selecting the group of nodes as the event detecting nodes includes notifying selected nodes.

14. The method of claim 13, wherein notification to a node in the event detecting nodes includes identification of an intermediate computation node, wherein the node provides a response to the event subscription interest packet via the intermediate computation node.

15. The method of claim 14, wherein the intermediate computation node only transmits responses to the event subscription interest packet that traverse a geographic sub-part of the coverage area.

16. The method of claim 14, wherein the intermediate computation node at least one aggregates responses or compresses responses it receives from other nodes.

17. At least one non-transitory machine-readable medium including instructions for information centric network (ICN) emergency data collection, the instructions, when executed by processing circuitry, cause the processing circuitry to perform operations comprising: measuring an event coverage area; transmitting an interest packet specifying a group prefix for the coverage area to identify nodes within the coverage area; selecting a group of nodes that respond to the interest packet specifying the group prefix as event detecting nodes, the event detecting nodes selected from responding nodes based on metrics of the responding nodes, the responding nodes including all nodes that sent data packets in response to the interest packet specifying the group prefix, the metrics including dispersal in the coverage area, connectivity, or sensor capability, the group of nodes selected from all nodes that respond based on the metrics; and transmitting an event subscription interest packet to the event detecting nodes, the event subscription interest packet including a prefix or tag causing the event subscription interest packet to be ignored by responding nodes that are not event detecting nodes.

18. The at least one non-transitory machine-readable medium of claim 17, wherein the subscription interest packet includes an indication of a level of acceptable redundancy in response data.

19. The at least one non-transitory machine-readable medium of claim 17, wherein the operations comprise:
transmitting a relay interest packet to identify relay nodes; and
selecting a group of relay nodes from responses.

20. The at least one non-transitory machine-readable medium of claim 19, wherein nodes in the group of relay nodes themselves perform a relay node selection until the event detecting nodes cover the coverage area and are within one hop to a relay node.

21. The at least one non-transitory machine-readable medium of claim 17, wherein selecting the group of nodes as the event detecting nodes includes notifying selected nodes.

22. The at least one non-transitory machine-readable medium of claim 21, wherein notification to a node in the event detecting nodes includes identification of an intermediate computation node, wherein the node provides a response to the event subscription interest packet via the intermediate computation node.

23. The at least one non-transitory machine-readable medium of claim 22, wherein the intermediate computation node only transmits responses to the event subscription interest packet that traverse a geographic sub-part of the coverage area.

24. The at least one non-transitory machine-readable medium of claim 22, wherein the intermediate computation node at least one aggregates responses or compresses responses it receives from other nodes.

\* \* \* \* \*

UNITED STATES PATENT AND TRADEMARK OFFICE
CERTIFICATE OF CORRECTION

PATENT NO. : 11,075,810 B2  
APPLICATION NO. : 16/456864  
DATED : July 27, 2021  
INVENTOR(S) : Jha et al.

Page 1 of 2

It is certified that error appears in the above-identified patent and that said Letters Patent is hereby corrected as shown below:

In the Claims

In Column 18, Line 15, in Claim 1, after "comprising:", insert a linebreak

In Column 18, Line 16, in Claim 1, after "and", insert a linebreak

In Column 18, Line 18, in Claim 1, after "to:", insert a linebreak

In Column 18, Line 18, in Claim 1, after "area;", insert a linebreak

In Column 18, Line 20, in Claim 1, after "area;", insert a linebreak

In Column 18, Line 29, in Claim 1, after "and", insert a linebreak

In Column 18, Line 55, in Claim 7, delete "event," and insert --event-- therefor In Column 18, Line 59, in Claim 8, delete "east" and insert --at least-- therefor In Column 18, Line 62, in Claim 9, after "comprising:", insert a linebreak In Column 18, Line 63, in Claim 9, after "area;", insert a linebreak In Column 18, Line 65, in Claim 9, after "area;", insert a linebreak In Column 19, Line 7, in Claim 9, after "and", insert a linebreak In Column 19, Line 42, in Claim 17, after "comprising:", insert a linebreak In Column 19, Line 43, in Claim 17, after "area;", insert a linebreak Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,075,810 B2

In Column 19, Line 45, in Claim 17, after "area;", insert a linebreak

In Column 20, Line 7, in Claim 17, after "and", insert a linebreak